United States Patent [19]

Khaidukov et al.

[11] 3,843,697

[45] Oct. 22, 1974

[54] PROCESS FOR PRODUCING ESTERS OF MONOHYDRIC ALCOHOLS AND CARBOXYLIC ACIDS BY ESTERIFICATION THEREOF AND REMOVAL OF ACIDIC IMPURITIES FROM THE RESULTING PRODUCT

[76] Inventors: Gennady Fedorovich Khaidukov, Ulitsa Vyazovskaya, 13, kv. 48; Larisa Vasilievna Zamuraeva, Ulitsa Vyazovskaya, 13, kv. 72; Anatoly Abramovich Kruglikov, Ulitsa Vyazovskaya, 9, kv. 9; Vladimir Petrovich Potapov, Ulitsa Mira, 12, kv. 12; Jury Artemievich Smirnov, Ulitsa Vyiskaya, 23; Mark Vladimirovich Bronov, Ulitsa Tsiolkovskogo, 11, kv. 18, all of N. Tagil Sverdlovskoi oblasti, U.S.S.R.

[22] Filed: Aug. 26, 1971

[21] Appl. No.: 175,383

[52] U.S. Cl.... 260/410.9 R, 260/475 B, 260/485 S, 260/499
[51] Int. Cl............................................ C07c 67/06
[58] Field of Search......... 260/410.9 R, 499, 475 B, 260/485 S, 475 PR, 425

[56] References Cited
UNITED STATES PATENTS

| 2,183,486 | 12/1939 | Colbeth | 260/425 |
| 2,508,911 | 5/1950 | Garner et al. | 202/57 |
| 2,753,369 | 7/1956 | Sullivan | 260/475 |
| 2,805,246 | 9/1957 | Bourguignon et al. | 260/475 |
| 3,226,407 | 12/1965 | Bergman | 260/424 |
| 3,413,324 | 11/1968 | Seip | 260/425 |

FOREIGN PATENTS OR APPLICATIONS 1,112,868 5/1968 Great Britain

*Primary Examiner*—Lewis Gotts
*Assistant Examiner*—Diana G. Rivers
*Attorney, Agent, or Firm*—Waters, Roditi, Schwartz & Nissen

[57] ABSTRACT

A process for producing esters of monohydric alcohols and carboxylic acids by esterification thereof comprising dispersing of the esterification product into drops of 1–10 mm size in an aqueous caustic alkali solution of a 2–20 percent concentration at a temperature of 40°–100° C to eliminate impurities therefrom.

11 Claims, No Drawings

PROCESS FOR PRODUCING ESTERS OF MONOHYDRIC ALCOHOLS AND CARBOXYLIC ACIDS BY ESTERIFICATION THEREOF AND REMOVAL OF ACIDIC IMPURITIES FROM THE RESULTING PRODUCT

The present invention relates to processes for the production of esters by reacting carboxylic acids with monohydric alcohols; said esters are useful as intermediates for organic synthesis and as plasticizers for various polymers. Dioctylphthalate, for instance, is a versatile plasticizer for polyvinyl chloride, dibutyl phthalate — for cellulose esters, dibutyl sebacate is a low temperature plasticizer for rubbers. It is generally known that substances employed in organic synthesis and in the production of polymeric materials should meet rather strict requirements with respect to the product purity.

In particular, the presence of acidic impurities in said esters greately impairs heat resistance thereof and causes thermal decomposition resulting in the formation of volatile products with unpleasant odour and deeply coloured compounds.

Since processes for the production of polymeric materials using said esters as plasticizers are usually performed at elevated temperatures, said impurities adversely affect the properties of said materials. Alkaline impurities, when present in said esters, cause saponification thereof upon heating accompanied by evolving of an alcohol and formation of salts.

Polymeric materials based on such plasticizers are opaque and have a fetid odour.

Various salt impurities cause turbidity of polymers. All the above-mentioned impurities are electrolytes, whereby dielectric properties of a plasticizer and of a polymer based thereon are impaired. It is especially intolerable in the production of electro-insulating materials and, more particularly, of a polyvinyl chloride cable plasticate.

It is known that in the synthesis of said esters by esterification of carboxylic acids or anhydrides thereof with alcohols the reaction is practically impossible to complete, i.e., to reach the 100 percent conversion of acids into esters, since the reaction is reversible and an equilibrium between the starting materials and the reaction products is accomplished within the limits of 70–80 percent. To increase the conversion level, the reaction is advantageously conducted with an excess of alcohol of 20–50 percent against the stoichiometric amount thereof. In doing so, it is possible to attain a 92–95 percent conversion level simultaneously with elimination of water, which is also a reaction product, whereas in the presence of an acidic catalyst such as sulphuric acid, benzene sulphonic acid or para-toluene sulphonic acid it is possible to reach as high a conversion level as 98.5–99 percent. Any further acid-to-ester conversion without a catalyst is unsuitable, since the esterification rate is rather low; it is far more unexpedient, to go on with the esterification when a catalyst is employed, for such catalyst is dissolved in the reaction product whereby it is indispensible to separate the resulting ester therefrom. In addition, a prolonged esterification reaction is useless in view of possible sidereactions of thermal decomposition resulting in the formation of impurities causing undesirable colouring of the ester. Therefore, it has been common practice in the art to carry out esterification up to a conversion level of 92–95 percent, while in the presence of said catalysts the esterification is usually conducted up to a 98.0–99 percent level of acid-to-ester conversion, the acidic impurities remaining in the reaction product being removed by neutralization with aqueous caustic alkali solutions or with soda.

The neutralization is carried out under vigorous stirring of the reaction product with aqueous alkaline solutions or soda having a 1–15 percent concentration and is completed when an acidic value of 0.03–0.08 mg KOH/g of the reaction mixture is reached, which corresponds to a 0.01–0.02 percent content of the free acid to be esterified. Any further neutralization is not advantageous since the resulting ester saponification can occur therewith.

On neutralization there are formed salts of non-esterified acid, acidic ester and catalyst which, because of being water-soluble, pass into an aqueous solution of a caustic alkali and soda. The esters in question are only slightly soluble in water and possess a lower density as compared therewith. Therefore, on completion of the stirring, the reaction mass is split into two layers: an ester layer and an aqueous layer. The separation is usually carried out in periodical or continuous settlers or in centrifugal separators. Since the resulting above-mentioned salts are surface-active substances, there occurs emulsifying of aqueous solution particles in the ester along with a certain amount of a free alkali and neutralization salts contained therein when conducting the neutralization in a described manner. It has not been hitherto possible to isolate such emulsified particles by sedimentation of separation. Though the content thereof is relatively small (it has been found that their amount was 0.02–0.08 percent based on elementary sodium), however, it exerts a detrimental effect on the quality of the resulting esters useful as plasticizers.

Therefore, the ester separated from the aqueous alkali solution and salts is subjected, after neutralization, to flushing with water of the purity similar to the purity of potable water until pH of washings is not more than 8. The flushing is conducted under vigorous agitation followed by separation of the ester layer from the aqueous layer in settlers or centrifugal separators. The overall quantity of water required for ester flushing in commercial practice is of 1.0–1.4 m$^3$ per ton of the resulting final product. The washings containing salts resulting from the neutralization step and a certain amount of a free alkali, cannot be reused in the production of esters and are delivered to the purification stage performed by any conventional method: combustion, biological purification, and the like.

Unreacted alcohol employed for the esterification is removed from the flushed product, e.g., by saturated steam, whereafter the product is finally purified by distillation or treatment with naturally-occurring or synthetic sorbents followed by filtering them off.

Such processes are described in U.S. Pat. Nos. 2,802,858; 2,854,475; 2,644,009 and also in a paper published in "Chem. Engin. Techn." No. 17, 1969; these processes being performed in a periodical or continuous manner.

Said prior-art processes have disadvantages residing in imperfect neutralization stage, which results in indispensable formation of an emulsion comprising particles of an aqueous solution containing salts formed during neutralization, and a free alkali in the ester; impossibility to separate said particles by sedimentation or centrifugation, resulting in an obligatory separation thereof from the ester by flushing it with water.

Hence, the process duration is increased and an additional unit should be included in the process equipment. Moreover, the production of esters is known to be a large-lot production, whereby considerable amounts of purified water are required, which, after having been used, must be purified by means of special installations, wherefore considerable capital investments are involved in such production.

When flushing an ester, a minor part thereof (of an order of 0.02–0.05 percent) is dissolved in water, whereby the yield of the final product is reduced. Loss of alcohol contained in the esterification product is still great because of high water-solubility thereof (0.1–0.3 percent), so that the cost of the final plasticizer is increased, since the alcohol per se in this case is the most expensive starting material.

It is known that various attempts have been made to overcome said process disadvantages by conducting the esterification reaction practically up to the 100 percent level of acid-to-ester conversion with appropriate catalysts, followed by isolation thereof from the resulting ester by a simple conventional technique, such as filtration. There is known, in particular, FRG Pat. No. 1,173,473, disclosing a process, wherein titanic acid is employed as an esterification catalyst; and also a paper by F. I. Meiers, FIAT PB 42,802 (1946) disclosing the use of a cationite as an esterification reaction catalyst. However, compared to other processes, said process has a certain disadvantage residing in the difficulty of producing such catalysts and the high cost thereof. The impossibility of repeatedly using such catalysts makes the final product cost so high that, even taking into account elimination of the neutralization and flushing stages and neglecting the loss of the starting materials and final product, the process is still much less efficient as compared to the known previously described processes.

In addition, ion-exchange resins at the esterification temperature are partially decomposed with the formation of ester-soluble compounds, contaminating the resulting product.

For the above-mentioned reasons said prior-art processes have not been used on a commercial scale.

In view of the above-said, it is a primary object of the present invention to provide a process for producing esters, wherein water flushing is dispensed with and whereby substantial amounts of waste water employed in the production of esters is eliminated.

It is another object of the present invention to increase the final product yield and to reduce loss of the starting materials.

These and other objects, according to the invention, are accomplished by a process for producing esters of monohydric alcohols and carboxylic acids by esterification thereof and removal of acidic impurities from the resulting product; in said process the removal of said impurities according to the present invention is effected by dispersing of the esterification product into drops in aqueous caustic alkali solutions.

Other objects and advantages of the pesent invention become apparent from the following detailed description thereof.

The process comprises esterification of carboxylic acids with monohydric alcohols containing four to 12 carbon atoms. As the carboxylic acids use can be made of monobasic aliphatic acids such as valeric acid, palmitic acid; aliphatic polybasic acids such as adipic and sebacic acids; aromatic mono- and polybasic acids such as benzoic and phthalic acids, instead of the latter the anhydride thereof being usually employed. Examples of monohydric alcohols used for esterification are butylalcohol, 2—ethylhexanol, dodecyl alcohol, mixtures of $C_7$–$C_9$ alcohols, produced by ICI Ltd. under the trademark "Alphanol-79," a mixture of alcohols with $C_6$, $C_8$ and $C_{10}$, produced by the firm Alphol.

Esterification of acids or anhydrides with alcohols is effected in the presence of an acidic catalyst such as sulphuric acid, benzene sulphonic acid, para-toluene sulphonic acid used in an amount of from 0.8–1.5 percent by weight of the acid or anhydride thereof employed for the esterification. The esterification temperature may vary in a wide range, depending on the nature of starting materials and the presence of a catalyst. The reaction may be effected in vacuum or under an elevated pressure starting from the atmospheric pressure.

The esterification reaction is carried out up to the maximum possible level of acid-to-ester conversion. To this end, water formed during the reaction is evacuated by means of such carrier as toluene, or by means of an alcohol taken in excess against the stoichiometric amount thereof. When esterifying, for instance, dibasic carboxylic acids in the presence of a catalyst, a molar ratio of an alcohol to an acid is 2.2–2.4:1 respectively. Esterification without a catalyst is effected with even greater excess of an alcohol: up to 3 moles per mole of a dibasic carboxylic acid or anhydride thereof.

Esterification without a catalyst should be conducted up to a level of acid-to-ester conversion of at least 90 percent and preferably 92–95 percent. In the presence of a catalyst the esterification reaction is rapid enough and is conducted to a level of acid-to-ester conversion of 98–99 percent.

On such esterification the resulting crude product usually contains various acidic impurities.

In case of the esterification of monobasic acids without a catalyst the acids employed for the esterification constitute such acidic impurities; in case of the esterification of polybasic acids, acidic esters thereof are such impurities, i.e., such compounds wherein not all the carboxy groups are substituted with ester groups, for instance, monobutylphthalate having the formula:

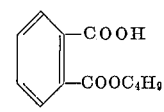

In the same case a certain amount of the acid used for the esterification may be present as an acidic impurity, but the probability of such presence is very small since carboxylic groups of polybasic acids are esterified sequentially, one after another. When esterification is carried out in the presence of a catalyst of an inorganic acidic nature, an acidic impurity of said catalyst such as sulphuric acid will be present in the esterification product along with said acidic impurities.

The resulting esterification product thus obtained is cooled to a temperature of 70°–80° C. Such cooling of products produced with an acidic catalyst and especially in vacuum, should be performed to prevent said products from the oxidation by atmospheric oxygen, which oxidation does not occur at 80° C and below. The esterification products obtained without a catalyst or under the atmospheric pressure are also cooled to a temperature of 70°–80° C.

In accordance with the invention the cooled product is dispersed in an aqueous caustic solution, preferably caustic soda or caustic potash, in order to eliminate acidic impurities contained therein. The dispersing may be effected by any conventional means ensuring formation of drops of said products, for instance by means of perforated pipes, screens, nozzles and the like.

Removal of acidic impurities from drops can be explained in the following way. Since all these acidic impurities are ionic substances, they dissociate to form charged particles. Such ionic dissociation occurs in an aqueous alkaline solution as well. As a result of electrostatical interaction the charged particles of acidic impurities diffuse from the interior of a drop towards the external surface thereof. There on the surface of a drop said acidic impurities are contacted with a caustic alkali solution, whereby they are neutralized to form salts. These salts being essentially water-soluble and practically insoluble in an ester, pass from the surface of a drop into an aqueous caustic alkali solution.

It should be noted, that all esters possess a lower density as compared to that of aqueous alkali solutions, wherefore a drop of an esterification product in said solution will move freely upwards under the action of expelling force; said drop will be set in rotative motion contributing to mechanically removing salts formed during neutralization from the surface of a drop.

In order that this type of diffusion could actually occur, it is necessary to ensure an appropriate concentration of the aqueous caustic alkali solution. It has been found that this necessary concentration of caustic soda or caustic potash varies from 2 to 20% and is selected depending on the acidic nature of impurities in the esterification product.

To completely remove acidic impurities from a drop of said product, it is necessary that such drop remain in a caustic alkali solution for a certain period of time. Since a drop in the solution tends to move upwards, its residence time therein is determined by the height of the solution layer. Therefore, to remove acidic impurities from an esterification product, it is necessary that such layer be high enough to complete diffusion of impurities from the inside of a drop onto the external surface thereof during the period of ascending. It should be noted, that an impurity diffusion time also depends on the drop size. The smaller is a drop, the shorter will be the period of time necessary to complete the diffusion. In the process of the present invention the removal of acidic impurities is substantially complete when a drop size is of from 1 to 10 mm. However, it is preferable to perform the process by dispersing the esterification product into drops of 1–3 mm size, since an increased drop size results in an increased period of acidic impurity diffusion from a drop, and to complete the diffusion it is necessary to have a greater height of an aqueous caustic alkali solution layer. Dispersing of an esterification product into drops of 1 mm or less is unsuitable in view of possible risk of an emulsion formation in the employed aqueous alkali solution and impossibility of separating the ester therefrom.

The temperature at which the dispergation of the esterification product should be conducted in a range of 40° to 100° C is preferably maintained within the range of from 50° to 70° C. Below 40° C the product viscosity is too high which hinders acidic impurities diffusion from drops of the product. At a temperature over 70° C there exists a risk of product saponification, though said diffusion process may be satisfactorily performed up to 100° C. Over 100° C there can occur an "effervescence" of an aqueous caustic alkaline solution, whereby bubbles of steam are formed which, along with mechanically entrapped particles of alkali solution and salts, will intrude into a drop of an esterification product and, hence, after removing acidic impurities therefrom in said esterification product free alkali and salts will be present, and for removal thereof it is necessary to employ water flushing, which is contrariwise to the present invention.

After dispersion of an esterification product into drops, ascending thereof in a caustic alkali solution and removal of acidic impurities therefrom during the ascending time, said drops coalesce over the above-mentioned solution layer to form, in turn, a layer of a product, so-called "crude ester," which is free from both acidic impurities and salts thereof.

Since in the ester there is a certain amount of the alcohol intended for the esterification, (because the alcohol is taken for the esterification in excess as described hereinbefore), said alcohol is eliminated from the crude ester by any conventional technique such as by distilling off with live steam. Thereafter, the product is subjected to final purification to ensure discolouring of the product and obtaining required dielectric properties thereof, which properties as a rule, are characterized by a volume resistivity; said final purification is effected by an appropriate conventional method such as vacuum distillation or treatment with solid sorbents, more particularly, with naturally-occurring clays, activated charcoal, followed by filtering them off.

The present invention is advantageous in that the process for producing said esters is effected without water flushing at the stage of eliminating acidic impurities and salts thereof from the esterification product. This permits reducing the amount of a treated water used in known processes for producing esters by 1.0–1.4 cu.m per each ton of the final product. As compared to the known processes wherein water washings should be purified by means of a special equipment, which is rather energy- and labour-consuming, the process according to the present invention has an advantage in that there are no aqueous washings involved therein, whereby there is no need to make capital investments in the treatment of said waters.

Another advantage of the present invention resides in that the yield of the final product is increased while loss of the starting materials, which is usually inevitable in a conventional process because of the product and starting material solubility in washings, is reduced.

Still another advantage of the present invention resides in that to remove acidic impurities and salts thereof from the esterification product it takes less time as compared to known periodic processes, whereby the productivity of operating equipment is increased. In a continuous process for producing esters the number of process units is reduced because of eliminating water flushing operations; in the known processes these units are usually employed for water treatment, heating, delivering to the flushing stage, separation of washings from a crude ester, collection and evacuation of said washings; a number of control and measuring instruments are also eliminated. In a process according to the present invention the removal of acidic impurities and salts thereof from the esterification product is effected in a single apparatus ensuring contact between the esterification product and aqueous alkali solution, and separation thereof from the ester, i.e., in conventional widely used differential-contact extractors.

An essential advantage of our process resides also in its improved and simplified application for continuous, highly efficient, and advanced production of ester.

The process according to the present invention is further illustrated by the following non-limiting examples of its embodiment.

EXAMPLE 1

202 g of sebacic acid, 185 g of butanol and 2 g of benzene sulphonic acid were charged into a three-neck 1 l flask provided with a stirrer, thermometer, reflux condenser and Dean-Starck trap for eliminating reaction water. The flask contents was heated under stirring to a temperature of from 130° to 135° C and this temperature was maintained within the above-mentioned range until 36 ml of the reaction water was evolved and collected in said trap. The level of acid-to-ester conversion was controlled by an acidic value of the reaction mass. The acidic value was determined by titration of a sample of the reaction mixture with a 0.05N solution of potassium hydroxide. At the acidic value of 3.5 mg KOH/g the reflux condenser and the Dean-Starck trap were disconnected and replaced with a direct condenser whereafter butanol in excess was distilled off in vacuum of 600–650 mm Hg until the reaction product density of at least 0.930 g/cm³ was reached. In doing so, acidic value of the reaction mass was reduced to 3.0 mg KOH/g, which corresponded to the level of sebacid acid-to-dibutylsebacate conversion of 99.1 percent.

Then the reaction product was cooled to 80° C and drained into a vessel provided with a water jacket to maintain the product temperature at about 70° C. From the vessel the esterification product containing benzene sulphonic acid and monobutyl sebacate was fed into a glass column with 25 mm diameter and 2,100 mm height, filled with a 6 percent aqueous caustic potash solution up to the height of 1,600 mm. The supply was effected by means of a glass pipe, one end thereof being inserted in the lower part of said column and having an opening of 1 mm diameter. The column was also provided with a water jacket to maintain the KOH solution temperature at about 70° C. The vessel bottom, through which the product supply was effected, was spaced 320–330 mm above the upper level of the KOH solution in the column to overcome hydrostatic head of said solution. When discharging from the pipe opening, the product was dispersed into drops of 1.0–1.2 mm size, wherefrom monoester and benzene sulphonic acid were eliminated during the period of ascending said drops through the aqueous layer of the KOH solution. Purified drops of the product coalesced over the caustic potassium solution, thus forming a continuous layer of the product having an acidic value within the range of from 0.03–0.05 mg KOH/g. This product was evacuated via a discharge pipe, and butanol traces were distilled off by live steam at the temperature of 140° C and under residual pressure of 80 mm Hg, whereafter said product was distilled at 190° C and 5 mm Hg.

The yield of dibutyl sebacate was 98.5 percent of its theoretical value; its properties were as follows:

| | |
|---|---|
| Colour on Hasen scale | No.10 |
| Acidic value | 0.03 mg KOH/g |
| Ester content | 99.7% |
| Brenken flash point | 186°C |

EXAMPLE 2

444 g of phthalic anhydride, 5 g of para-toluene sulphonic acid and 963 g of an alcohol mixture produced by "Condea Company" under the trade name "Alphol 610" and containing n-hexanol, n-octanol, n-decanol with a small amount of n-butanol and n-dodecanol, were charged into a 2 l glass three-neck flask provided with a thermometer, a reflux condenser, a Dean-Stark trap and a stirrer.

The flask contents was heated with stirring up to a temperature of 125°–130° C and to vacuum of 620–650 mm Hg. The esterification reaction was effected under the above-mentioned temperature and vacuum conditions until the acidic value of the reaction mixture was 3.2 mg KOH/g not more, which corresponded to the level of phthalic anhydride-to-dialkylphthalate conversion of 99.2 percent.

The resulting product was cooled to 80° C and drained into the vessel described in Example 1. The esterification product was then dispersed into drops of 1.5–1.8 mm size by passing from said vessel into the column described in Example 1 and filled with a 7 percent aqueous caustic soda solution up to the layer thickness of 2,000 mm. Acidic impurities of para-toluene sulphonic acid and monoalkylphthalate were eliminated from said drops of the esterification product ascending through the caustic soda solution, at a temperature of from 65° to 70° C. Purified drops formed a layer of a crude ester having the acidic value of 0.05 mg KOH/g. Said layer was evacuated via a discharge pipe. Remaining alcohol was distilled off from the ester by means of a live steam at 150° C and under residual pressure of 60 mm Hg; then the ester was cooled to 80° C and treated at this temperature with 3.5 g of a gumbrine clay and 3.5 g of activated charcoal for a period of one hour.

Thereafter said sorbents were filtered off to obtain a dialkylphthalate based on $C_6$–$C_{10}$ alcohols with the yield of 99 percent. The product had the following properties:

| | |
|---|---|
| Colour on Hasen scale | Nr.15 |
| Acidic value | 0.05 mg KOH/g |
| Ester content | 99.6% |
| Brenken flash point | 208°C |
| Volume resistivity | 5.10 ohm.cm |

EXAMPLE 3

A unit comprising 7 series-connected mixing 50 l reactors, each being provided with a reflux condenser, florentine vessel for separating reaction water and recycling alcohol back to the reaction zone and heating coils, was fed with 22 kg/hr of melted phthalic anhydride and 58 kg/hr of 2 — ethylhexanol. Esterification reaction was conducted under atmospheric pressure and at a temperature of 195°–200° C.

The product leaving the last reactor had an acidic value of 8–10 mg KOH/g which corresponded to the 95 percent level of conversion of phthalic anhydride into diester; said product was passed through a cooler wherein it was cooled to 80° C and then fed into a constant-level tank. The esterification product was delivered from said tank to a column for separation of acidic impurities. This column comprised two compartments, namely, the lower one — neutralizing compartment — having 200 mm diameter and 2,000 mm height; the upper one — settling compartment — having 400 mm diameter and 400 mm height. The neutralizing compartment was provided with a water jacket to maintain a 50°–70° C temperature therein.

In the neutralizing compartment of the column at the height of 200 mm there was provided a device in the form of a perforated screen with openings of 2 mm diameter intended for the introduction and dispersing of the product. The esterification product was fed into the device from the constant-level tank and dispersed into drops of 2.0–2.5 mm size. The drops were passed through a 5 percent aqueous caustic soda solution filling the column. After having passed through the layer of said solution of 2,000 mm thickness with decontamination from the acidic impurity of mono—2—ethyl hexyl phthalate which was neutralized with said solution to form a sodium salt, the drops of the product having an acidic value of 0.03–0.05 mg KOH/g were collected over the alkaline solution layer thus forming a layer by a crude ester with the thickness of about 150 mm. In order to maintain in the column the aforementioned concentration of an aqueous alkali solution a fresh alkali solution was fed thereto, and the solution of salts thus formed was evacuated therefrom.

The resulting crude ester was delivered to the distilling off the remaining alcohol by means of a live steam followed by treatment with a gumbrine clay in the amount of 5 percent by weight of the ester thus obtained and filtered on a filter-press.

The monoester salts were acidified with sulphuric acid, whereby monoester was formed which was then washed with an equal amount of water and fed into the esterification reactor.

The yield of di—2—ethylhexylphalate was 99.3 percent, and the properties were as follows:

| | |
|---|---|
| Colour on Hasen scale | No.10 |
| Acidic value | 0.05 mg KOH/g |
| Ester content | 99.6% |
| Brenken flash point | 210°C |
| Volume resistivity | 6.10 ohm.cm |

EXAMPLE 4

The unit of Example 3, but comprising 3 series-connected reactors was fed with 20 kg/hr of melted phthalic anhydride, 42 kg/hr of the "Alphanol–79" alcohol and 0.2 kg/hr of sulphuric acid. The esterification was carried out in vacuum of 620–650 mm Hg at 130° C to the 99.2 percent level of acid-to-ester conversion. Acidic impurity of sulphuric acid and monoalkylphthalate was removed from the esterification product by dispersing into drops in a manner similar to that disclosed in Example 3 with the only difference being that said impurities were removed in a 8 percent aqueous caustic soda solution.

Further purification was carried out as in Example 3 and a $C_7$–$C_9$ alcohol-based dialkylphthalate was obtained with the yield of 99.1 percent and following properties:

| | |
|---|---|
| Colour on Hasen scale | No.30 |
| Acidic value | 0.03 mg KOH/g |
| Ester content | 99.7% |
| Brenken flash point | 205°C |
| Volume resistivity | 2.5–10 ohm.cm |

EXAMPLE 5

404 g of sebacic acid and 780 g of 2-ethylhexanol were charged into a 2 l glass flask of Example 2. The esterification was carried out under atmospheric pressure at 200° C and completed at the acidic value of the reaction mass 0.9 mg KOH/g which corresponded to the 99.6 percent level of conversion of sebacic acid into 2—ethylhexyl sebacate.

Thereafter the procedure of Example 2 was repeated with the only difference that removing acidic impurity of mono—2—ethylhexylsebacate was effected by dispersing the esterification product into drops of 2.6–2.9 mm size in a 2 percent aqueous caustic potash solution.

2 — ethylhexylsebacate was obtained with the yield of 99.5 percent. The product had the following properties:

| | |
|---|---|
| Colour on Hasen scale | No.20 |
| Acidic value | 0.05 mg KOH/g |
| Ester content | 99.6% |
| Brenken flash point | 220°C |
| Volume resistivity | 8.10 ohm.cm |

EXAMPLE 6

The unit disclosed in Example 3 was fed with 30 kg/hr of synthetic normal fatty acids with four to 10 carbon atoms and 18 kg/hr of butanol. The procedure of Example 3 was then repeated with the only difference that the esterification product containing 2 percent of now esterified acids was dispersed in a 12 percent aqueous caustic soda solution and was not treated with sorbents after elimination of acidic impurities.

The yield of a butyl ester of $C_4$–$C_{10}$ acids was 99.2 percent, the product had the following properties:

| | |
|---|---|
| Colour on Hasen scale | No.30 |
| Acidic value | 0.05 mg KOH/g |
| Ester content | 99.6%. |

We claim:
1. A process for the production of esters from monohydric alcohols containing four to 12 carbon atoms and mono- or poly- basic carboxylic acids or anhydrides thereof, consisting in the steps of:
   a. esterifying said carboxylic acids or anhydrides thereof with said alcohols, the alcohols being used in an amount in excess of the stoichiometric amount with respect to said acids or anhydrides until a level of acids-to-esters conversion of at least 90 is reached;
   b. dispersing the resulting esterification product containing impurities of non-esterified acid and acidic ester, when polybasic acid is used, into drops of 1.0–10 mm size in an aqueous caustic alkali solution having a concentration in the range of from 2 to 20 percent by weight, based on the particular acid or anhydride being employed, at a temperature of from 40° to 100°C. said solution being dis- posed in a layer of a thickness sufficient to complete the diffusion of said impurities from inside of said drops onto the surface of said drops during the time of the ascension of said drops through said layer; said impurities being neutralized on the surface of said drops by the aqueous caustic alkali solution and forming salts which pass into the aqueous caustic alkali layer, and said drops coalescing over said layer of caustic alkali solution and forming a continuous layer of product free from non-esterified acid, acidic ester, when a polybasic acid is used, and salts thereof;

c. removing the remaining alcohol from the product;

d. and discoloring and ensuring the required dielectric properties in the product by distilling or contacting the product with sorbents.

2. A process according to claim 1, wherein the dispersing of the esterification product is effected at a temperature in a range of 50° – 70° C.

3. A process according to claim 1, wherein the dispersing of the esterification product is effected in drops of 1–3 mm size.

4. A process according to claim 1, wherein the dispersing of the esterification product is effected in an aqueous caustic soda solution.

5. A process according to claim 1, wherein the dispersing of the esterification product is effected in an aqueous caustic potash solution.

6. A process for the production of esters from monohydric alcohols containing four to 12 carbon atoms and mono- or polybasic carboxylic acids or anhydrides thereof, consisting in the steps of:

a. esterifying said carboxylic acids or anhydrides thereof with said alcohols, the alcohols being used in an amount in excess of the stoichiometric amount with respect to said acids or anhydrides until a level of acids-to-esters conversion of at least 90 percent is reached, in the presence of an acidic catalyst selected from the group consisting of sulphuric acid, benzene sulphonic acid and para-toluene sulphonic acid;

b. dispersing the resulting esterification product containing impurities of non-esterified acid, acidic ester, when polybasic acid is used, and said acidic catalyst into drops of 1.0–10 mm size in an aqueous caustic alkali solution having a concentration in the range of from 2 to 20 percent by weight, based on the acid or anhydride and catalyst employed for the esterification and at a temperature of from 40° to 100° C. said solution being disposed in a layer of a thickness sufficient to complete the diffusion of said impurities from inside of said drops onto the surface of said drops during the time of the ascension of said drops through said layer; said impurities being neutralized on the surface of said drops by the aqueous caustic alkali solution and forming salts which pass into the aqueous caustic alkali layer and said drops coalescing over said layer of caustic alkali solution, and forming a continuous layer of product free from non-esterified acid, acidic ester when a polybasic acid is used and salts thereof;

c. removing the remaining alcohol from the esterification product;

d. and discoloring and ensuring the required dielectric properties in the product by distilling or contacting the product with sorbents.

7. A process according to claim 6, wherein the dispersing of the esterification product is effected at a temperature in a range of 50° to 70° C.

8. A process according to claim 6, wherein the dispersing of the esterification product is effected in drops of 1 to 3 mm size.

9. A process according to claim 6, wherein the dispersing of the esterification product is effected in an aqueous caustic soda solution.

10. A process according to claim 6, wherein the dispersing of the esterification product is effected in an aqueous caustic potash solution.

11. A process according to claim 1, wherein the level of acids-to-esters conversion of at least 92 percent is reached.

* * * * *